(12) United States Patent
Luther et al.

(10) Patent No.: US 6,536,956 B2
(45) Date of Patent: Mar. 25, 2003

(54) FERRULE BOOT FOR OPTICAL CONNECTORS

(75) Inventors: James P. Luther, Hickory, NC (US); Thomas Theuerkorn, Hickory, NC (US); Rodney A. Throckmorton, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/915,825

(22) Filed: Jul. 26, 2001

(65) Prior Publication Data

US 2003/0021548 A1 Jan. 30, 2003

(51) Int. Cl.[7] .................................................. G02B 6/36
(52) U.S. Cl. ....................................................... 385/86
(58) Field of Search ............................... 385/85, 86, 87, 385/88, 89

(56) References Cited

U.S. PATENT DOCUMENTS

| | | | |
|---|---|---|---|
| 5,151,962 A | 9/1992 | Walker et al. ................. 385/86 |
| 5,214,730 A | 5/1993 | Nagasawa et al. ............. 385/59 |
| 5,317,664 A | * 5/1994 | Grabiec et al. ................ 385/81 |
| 5,329,603 A | 7/1994 | Watanabe et al. ............. 385/86 |
| 5,781,681 A | 7/1998 | Manning ....................... 385/86 |
| 5,806,175 A | 9/1998 | Underwood .................. 29/748 |
| 5,915,058 A | * 6/1999 | Clairardin et al. ............. 385/55 |
| 5,971,624 A | * 10/1999 | Giebel et al. .................. 385/59 |
| 6,004,042 A | * 12/1999 | Million et al. ................. 385/59 |

* cited by examiner

Primary Examiner—Tulsidas Patel

(57) ABSTRACT

A ferrule boot for attachment to an optical fiber ribbon has a channel extending therethrough. The channel has at its distal end a first tapered lead-in section sized and dimensioned such that the optical fiber ribbon with the internal optical fibers stripped and exposed is insertable through the ferrule boot. The first tapered lead-in section is connected to a second tapered section, and the second tapered section prevents adhesives used to affix the optical fiber ribbon to a ferrule from wicking to the outside of the ferrule boot. The channel has a substantially straight section fitting intimately over the outside of the optical fiber ribbon to center and guide the exposed optical fibers to the center of the proximal end of the channel. In an embodiment, the ferrule boot also has a lip member disposed proximate to the proximal end of the channel to help seal the adhesive and ease insertion. Additionally, the lip may also prevent withdrawal of the optical fiber ribbon. In another embodiment, the ferrule boot also has a vent hole to allow air or other gases trapped in the ferrule boot cavity to vent to the ambient atmosphere.

17 Claims, 3 Drawing Sheets

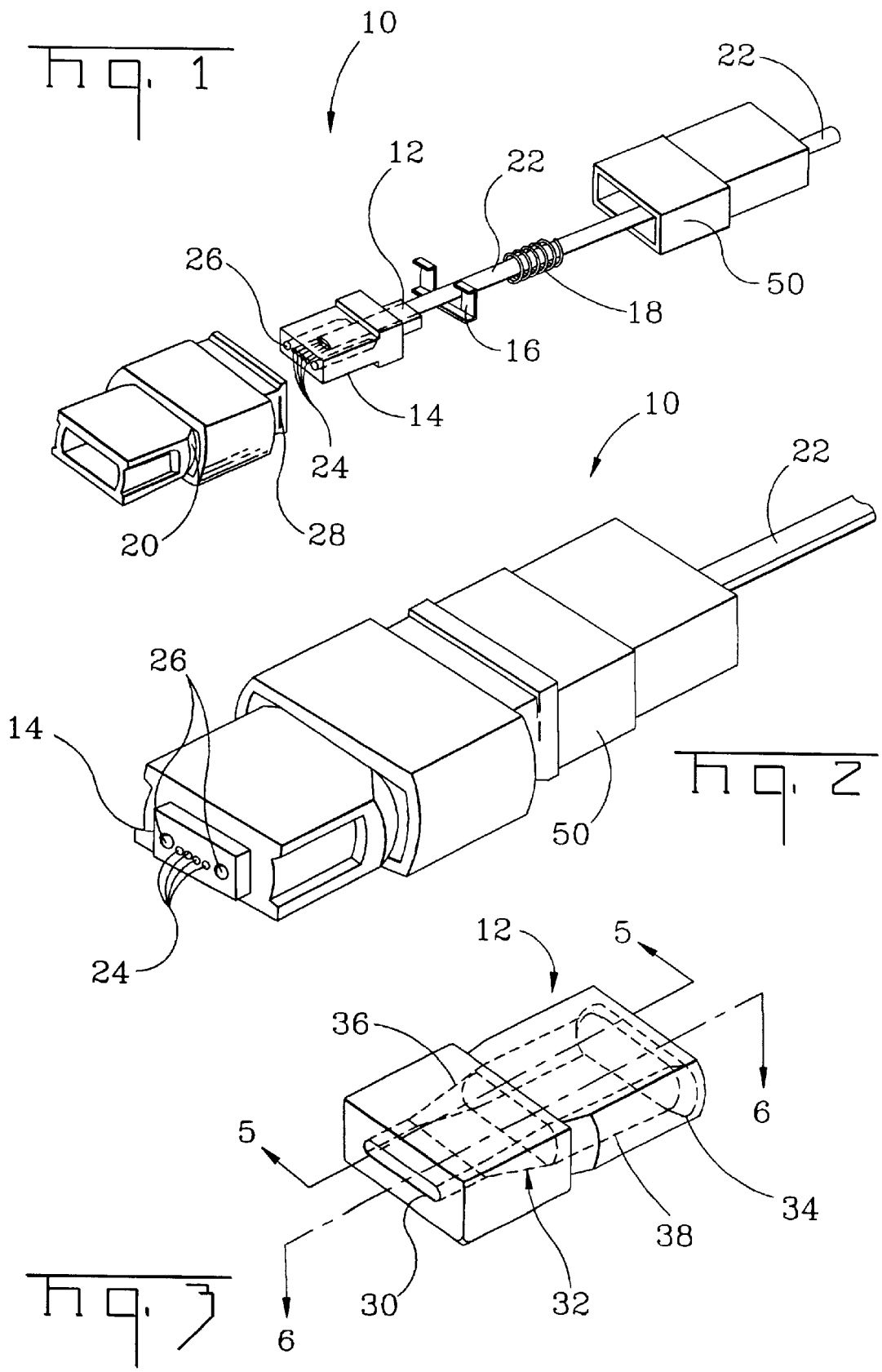

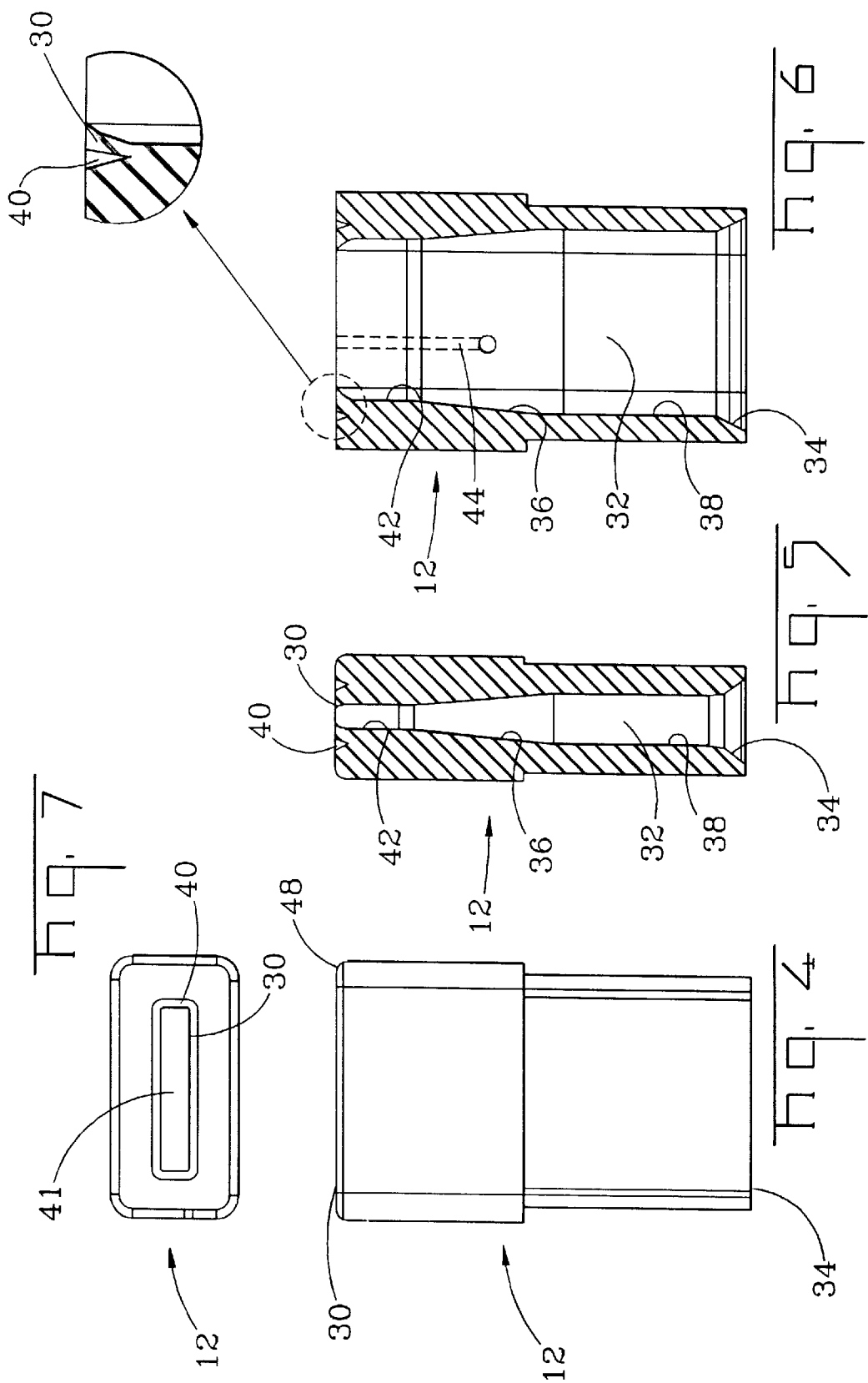

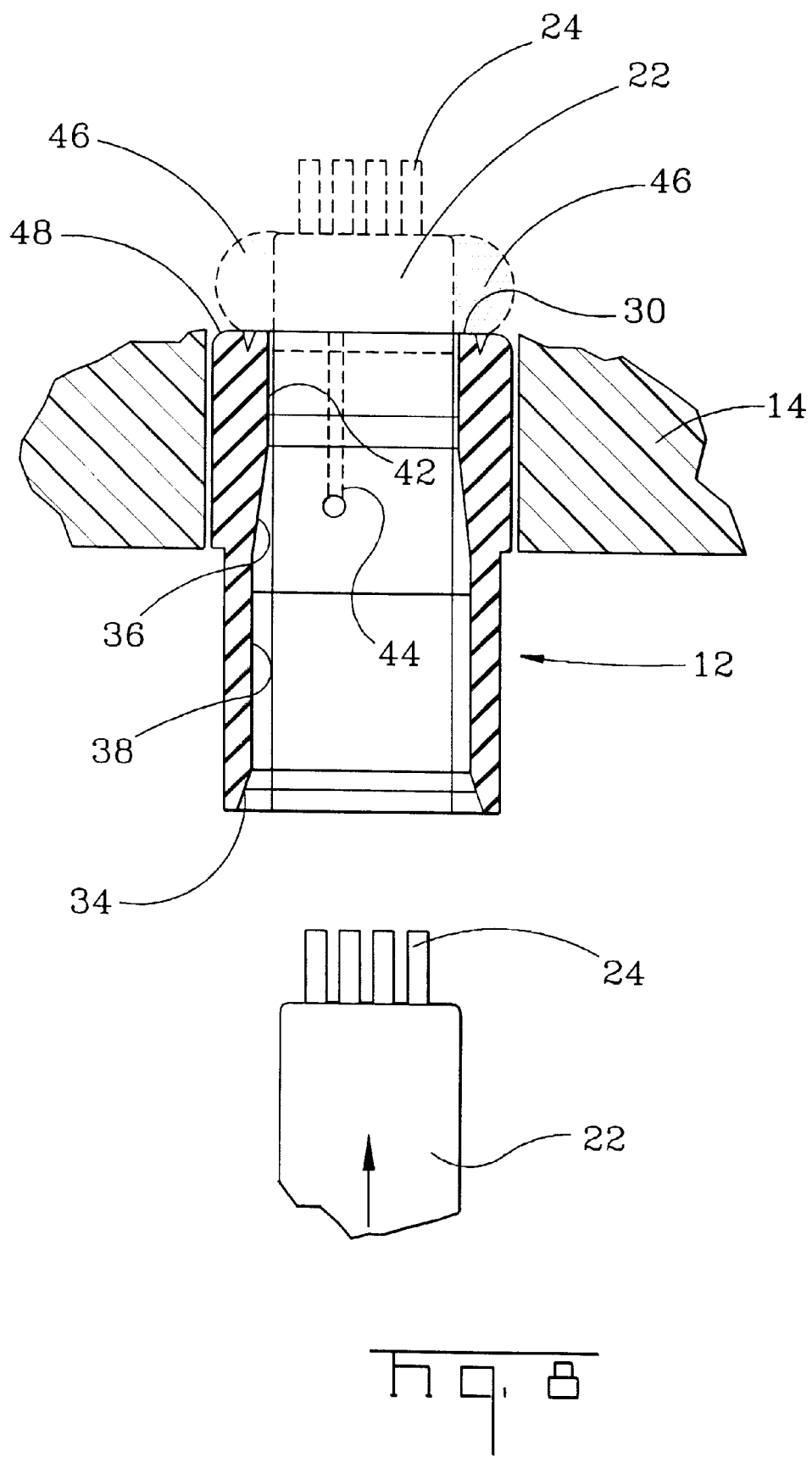

FERRULE BOOT FOR OPTICAL CONNECTORS

FIELD OF THIS INVENTION

This invention relates to a novel structure for a strain relief device for attachment to a terminal connector for an optical fiber or an optical fiber ribbon. More particularly, this invention is directed to an enhanced multifiber boot that is capable of being installed by automated assembly and that has improved ribbon retention.

BACKGROUND OF THIS INVENTION

Optical fiber ribbons may include one or more optical fibers capable of transmitting audio, video, text, or other information. Optical fiber ribbons are laid over long distances and must make twists and turns, and, therefore, require connectors to connect discrete segments of optical fiber ribbons together or to connect an optical fiber ribbon to a terminal or signal port of an apparatus or other equipment. As used herein, the term "connector" includes numerous fiber optic connectors which may have a variety of ferrule configurations, including, for example, an MT, MT-S, MTP, MT-RJ and DC connectors. These optical fiber ribbons have a matrix, including a central optical fiber or a series of optical fibers, that carries information. Surrounding the optical fibers is a protective acrylate primary fiber coating, that in turn is followed by a layer of strength fibers, such as, for example, strength fibers made from Kevlar. Surrounding the strength fibers is a protective outer coating. At each end of the ribbon, it is necessary to attach a terminal connector securely so that information is properly transferred from the optical fiber ribbon through a mating connector or communicating hardware. Therefore, it is imperative that the ribbon is reliably and sturdily connected to the terminal connector so that the information is preserved and properly transferred.

As generally known in the art, the ribbon can be attached to a terminal connector using an adhesive, such as, for example, an epoxy resin. The conventional method makes use of a connector boot that is first placed over a terminal end of the optical fiber ribbon and then followed by a spring, a ferrule boot, and other connector assembly components. Thereafter, the outer coating of the ribbon is removed from the end of the ribbon matrix while preserving the strength fibers lying there beneath. The exposed strength fibers are bent rearward to fully expose the primary fiber coating. Next, a given length of the primary fiber coating is removed to expose a given length of bare optical fibers. Then, the ferrule boot is positioned over the exposed primary fiber coating. The ferrule boot and the exposed ribbon fiber are coupled together using an epoxy resin. Then, the ferrule boot and the exposed strength fibers are securely adhered to a portion of the ferrule or the connector, for example, as described for example in U.S. Pat. No. 5,806,175. Next, a connector pin-clamp is attached to the connector assembly. The pin-clamp can be universal, male, or female, depending on the orientation desired. Finally, the connector assembly is inserted into and coupled with a housing to form the terminal connector.

A ferrule boot serves two primary functions. First, it provides a certain strain relief to the optical fiber ribbon, particularly where no protecting plug hardware is present. Second, it prevents the epoxy resin from flowing out of the connector cavity. As is well know in the terminal connector art, the ferrule boot typically is the first component installed onto the ribbon. The prior art boot is sized and dimensioned to fit intimately over the ribbon, such as, for example, the boots shown in U.S. Pat. Nos. 5,214,730; 5,151,962; 5,329,603 and 5,781,681. Due to the intimate fit of the boot over the ribbon, the protective layers on the ribbon's matrix cannot be stripped to expose the fragile optical fibers prior to installing the ribbon to the ferrule boot to prevent the optical fibers from breaking. This tight tolerance and the inability to pre-strip the ribbon prior to assembling the connector hinder automated installation efforts. Since large numbers of terminal connectors are manufactured every day, the inefficiencies created by current assembly processes that are less than fully automated quickly result in significantly increased manufacturing times and costs.

Thus, there is a need for optical fiber ribbon connector that is capable of being installed by automated assembly. Further, there is a need in the art for an optical fiber ribbon connector that has improved ribbon retention.

SUMMARY OF THIS INVENTION

Accordingly, it is an object of this invention to provide a terminal connector that is capable of being automatically assembled.

Another object of this invention is to provide an enhanced boot for a terminal connector that improves automated assembly.

Another object of this invention is to provide an enhanced boot for a terminal connector that improves optical fiber ribbon retention.

These and other objects, features, aspects, and advantages of this invention are realized by a ferrule boot for protecting an optical fiber ribbon connected to a terminal connector. The ferrule boot comprises a body member defining a channel extending therethrough, and a first tapered lead-in located at a distal end of the channel. The first tapered lead-in is sized and dimensioned such that the optical fiber ribbon with the optical fibers stripped and exposed is insertable through the boot from the distal end of the channel to a proximal end of the channel and then is affixed to the ferrule boot by adhesive. The first tapered lead-in is connected to a second tapered lead-in, and the second tapered lead-in prevents the adhesive from wicking to the outside of the ferrule boot.

The channel further comprising a substantially straight section sized and dimensioned to fit intimately over the outside of the optical fiber ribbon. This substantially straight section centers and guides the exposed optical fibers to the center of the proximal end of the channel. The ferrule boot also has a lip positioned proximate to the proximal end of the channel and oriented at an angle with the channel such that the lip functions as a seal and also facilitates easier insertion. In another embodiment, the lip also provides a lower resistance to movement of the optical fiber ribbon from the distal end of the channel to the proximal end of the channel and provides a higher resistance to movement of the optical fiber ribbon in the opposite direction.

The ferrule boot may also have a vent channel in fluid communication between a cavity in the boot and the ambient atmosphere to vent gas trapped in the boot cavity. For example, the ferrule boot cavity may include a vent channel that extends lengthwise along a portion of the interior cavity and that terminates at the proximal end of the boot.

BRIEF DESCRIPTION OF THE DRAWINGS

The accompanying drawings form a part of the specification and are to be read in conjunction with the specification, in which like reference numerals are used to indicate like parts in the various views:

FIG. 1 is an exploded view of the connector assembly with a novel ferrule boot in accordance with this invention;

FIG. 2 is a perspective view of the connector assembly of FIG. 1 with the components assembled;

FIG. 3 is a perspective view of a preferred embodiment of the ferrule boot in accordance with this invention with internal structures shown in broken lines;

FIG. 4 is a top view of the ferrule boot shown in FIG. 3;

FIG. 5 is a cross sectional view of the ferrule boot taken at line 5—5 as shown in FIG. 3;

FIG. 6 is another cross sectional view of the ferrule boot taken at line 6—6 as shown in FIG. 3;

FIG. 7 is an end view of the ferrule boot shown in FIG. 3 showing the lip member; and FIG. 8 is cross sectional view similar to the FIG. 7 showing the assembly process.

DETAILED DESCRIPTION OF THIS INVENTION

As shown generally in FIGS. 1 and 2, reference number 10 broadly designates the terminal connector in accordance with this invention. Terminal connector 10 comprises at least ferrule boot 12, ferrule 14, stopper 16, spring 18, connector housing 20, and connector boot 50. Connector 10 may have greater or fewer components. As illustrated below, ferrule boot 12 is inserted into the ferrule 14. After the protective matrix is stripped away, the exposed optical fibers 24 of ribbon 22 are inserted into pre-existing optical fiber holes in ferrule 14. An adhesive epoxy is injected into ferrule 14 to secure ribbon 22 and optical fibers 24 and, in turn, to secure ferrule boot 12 with ferrule 14. Ferrule 14 also has two guide pin insertion holes 26 adapted to receive matching guide pins (not shown). Stopper 16 provides a backstop for the guide pins preventing them from entering the boot 50. Stopper 16 also provides an abutting surface for spring 18 to abut. After ferrule boot 12 with ribbon 22 and optical fibers 24 are secured to ferrule 14, connector boot 50 is positioned over the entire assembly, including stopper 16 and spring 18, and is inserted into connector housing 20 at distal end 28 until ferrule 14 protrudes therethrough, as illustrated in FIG. 2. After the epoxy is cured and the endface is polished, connector 10 can be mated with another terminal connector or connected to a signal port of an apparatus.

One embodiment of ferrule boot 12 is shown with more details in FIGS. 3–7. Ferrule boot 12 comprises at its proximal end a lip 30, which is designed to grip ribbon 22. As used herein, the term "proximal end" denotes the end of the boot where the lip 30 is positioned, and the term "distal end" denotes the opposite end. Internal channel 32 commences at lip 30 and extends through the body of ferrule boot 12 and terminates at the distal end of ferrule boot 12 to form first enlarged lead-in 34. Channel 32 also has second lead-in 36 located between lip 30 and first lead-in 34. First lead-in 34 is sized and dimensioned such that bare optical fibers 24 without the protection of the matrix can be easily inserted through the boot, as illustrated in FIG. 8. In accordance with an aspect of this invention, lead-in 34 is sized such that the insertion can be accomplished by automated assembly. In an embodiment of this invention, first lead-in 34 provides ample clearance for bare optical fibers 24 to enter to minimize the potential breakage of the bare fibers. After first straight section 38, the bare optical fibers 24 are further guided by second lead-in 36 directing optical fibers 24 toward lip 30. The gradual reduction offered by second lead-in 36 also helps prevent wicking of the adhesives from the ferrule cavity. It is well known in the art that liquid adhesives have a relatively high surface tension, and when presented with narrow passages, liquid adhesives tend to propagate through narrow passages due to capillary action. Second lead-in 36 minimizes such tendency by gradually enlarging the passageway presented to the liquid adhesives. Hence, second lead-in 36 confines the adhesives to the ferrule cavity and to the proximal portion of ferrule boot 12.

Lip 30 preferably separates from the proximal end of ferrule boot 12 by a gap 40. As shown in FIGS. 5 and 6, gap 40 separates lip 30 from the rest of the boot and directs lip 30 toward the center of channel 32. In this configuration, lip 30 and ferrule boot 12 are preferably made from an elastomeric material, and the space defined by lip 30 is preferably smaller than the cross-sectional area of the optical fiber ribbon 22. Hence, lip 30 grips ribbon 22 after the ribbon and the bare optical fibers 24 have passed through channel 32. To assist with the passage of bare optical fibers 24 through lip 30, channel 32 also has a second straight section 42 located preferably between lip 30 and second lead-in 36. Second straight section 42 is sized and dimensioned to fit intimately to the outside of ribbon 22, such that ribbon 22 is centered in channel 32 and bare optical fibers 24 are pointed at the center of the space 41 defined by lip 30. When properly positioned in accordance with this invention, bare optical fibers 24 may be inserted through lip 30 by automated assembly. The acute angle between lip 30 and channel 32, as shown in FIGS. 5 and 6, allows ribbon 22 to pass through, and functions to seal epoxy adhesive 46 and to ease insertion. In another embodiment, the acute angle between lip 30 and channel 32, as shown in FIGS. 5 and 6, allows ribbon 22 to pass through, but resists the withdrawal of ribbon 22 due to the fact that lip 30 allows passage of ribbon 22 with low resistance in one direction and with higher resistance in the other direction.

Ferrule boot 12 may also have at least one vent channel 44 preferably in fluid communication with the boot cavity and the ambient atmosphere. It is known in the art that air or other gases may be trapped in the ferrule cavity when ribbon 22 is inserted into the ferrule boot 12. The trapped air may hinder the injection of adhesives into the cavity. By providing a passageway for the trapped air to escape, the injected adhesives can more completely cover all the space between the ferrule 14 and the ferrule boot 12, thereby improving the adhesion between the ribbon 22 and the ferrule boot 12. Additionally, vent channel 44 also allows any gas evaporating from the liquid adhesives during injection to vent from the ferrule boot cavity.

FIG. 8 is an example showing the insertion of ribbon 22 and bare optical fibers 24 into ferrule boot 12 and ferrule 14. Due to the enlarged first lead-in 34, fibers 24 can be inserted with minimal opportunity for breakage. The second lead-in 36 further guides and orientates ribbon 22 toward second straight section 42, which aligns optical fibers 24 with lip 30. After ribbon 22 and fibers 24 have passed completely through ferrule boot 12, lip 30 grips ribbon 22 preventing its withdrawal. Adhesive 46 then can be injected into the ferrule cavity to adhere ribbon 22 and ferrule boot 12 to ferrule 14.

Furthermore, ferrule boot 12 has the same outer dimensions as the boots currently used in the field. Advantageously, ferrule boot 12 can replace the existing boots without requiring any changes to the rest of the terminal connector 10. Additionally, ferrule boot 12 may have chamfer edge 48, as shown in FIG. 4, to facilitate the connection of ferrule boot 12 to ferrule 14, as shown in FIG. 8.

Many modifications and other objects, features, aspects, and advantages of invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A ferrule boot for protecting an optical fiber ribbon connected to a terminal connector comprising:

a body member defining a channel extending lengthwise therethrough;

a first tapered lead-in located at a distal end of the channel, the first tapered lead-in is connected to a second tapered lead-in, wherein the first tapered lead-in is sized and dimensioned such that the optical fiber ribbon with a plurality of stripped and exposed optical fibers is insertable through the ferrule boot from the distal end of the channel to a proximal end of the channel; and the second tapered lead-in located at the proximal end of the channel.

2. The ferrule boot of claim 1, wherein the first tapered lead-in is affixed to a ferrule by an adhesive.

3. The ferrule boot of claim 2, wherein the second tapered lead-in prevents the adhesive from wicking to an exterior surface of the ferrule boot.

4. The ferrule boot of claim 1, wherein the channel further comprises a substantially straight section sized and dimensioned to fit intimately over the outside of the optical fiber ribbon, such that the substantially straight section centers and guides the stripped and exposed optical fibers to the center of the proximal end of the channel.

5. The ferrule boot of claim 1, further comprising:

a lip positioned proximate to the proximal end of the channel and oriented at an angle with the channel such that the lip seals the adhesive in the ferrule boot.

6. The ferrule boot of claim 5, wherein the lip further provides a lower resistance to movement of the optical fiber ribbon from the distal end of the channel to the proximal end of the channel and such that the lip presents a higher resistance to movement the optical fiber ribbon in the opposite direction.

7. The ferrule boot of claim 1, further comprising:

a vent channel in fluid communication between a cavity in the ferrule boot and the ambient atmosphere to vent gas trapped in the cavity.

8. The ferrule boot of claim 1, wherein the first tapered lead-in is attached to a ferrule using a snap fit assembly.

9. A ferrule boot for protecting an optical fiber ribbon connected to a terminal connector comprising:

a body member defining a channel extending therethrough; and a tapered lead-in located at a distal end of the channel, the tapered lead-in is sized and dimensioned such that the optical fiber ribbon with stripped and exposed optical fibers are insertable through the boot from the distal end of the channel to the proximal end of the channel and is affixed to a ferrule by adhesive, and wherein the channel has a substantially straight section sized and dimensioned to fit intimately over the outside of the optical fiber ribbon, such that the substantially straight section centers and guides the stripped and exposed optical fibers to the center of the proximal end of the channel.

10. The ferrule boot of claim 9, further comprising:

a lip positioned proximate to the proximal end of the channel and oriented at an angle with the channel such that the lip seals the adhesive in the ferrule-boot.

11. The ferrule boot of claim 10, wherein the lip further provides a lower resistance to the movement of the optical fiber ribbon from the distal end of the channel to the proximal end of the channel and such that the lip presents a higher resistance to the movement of the optical fiber ribbon in the opposite direction.

12. The ferrule boot of claim 9, further comprising:

a vent channel in fluid-communication between a cavity in the ferrule boot and the ambient atmosphere to vent gas trapped in the cavity.

13. A ferrule boot for protecting an optical fiber ribbon connected to a terminal connector comprising:

a body member defining a channel extending therethrough;

a tapered lead-in located at a distal end of the channel, the tapered lead-in is sized and dimensioned such that the optical fiber ribbon with a plurality of stripped and exposed optical fibers is insertable through the boot from a distal end of the channel to a proximal end of the channel and is affixed to a ferrule by adhesive; and a lip positioned proximate to the proximal end of the channel and, oriented at an angle with the channel such that the lip seals the adhesive in the ferrule boot and provides a lower resistance to movement of the optical fiber ribbon from the distal end of the channel to the proximal end of the channel and such that the lip presents a higher resistance to movement of the optical fiber ribbon in the opposite direction.

14. The ferrule boot of claim 13, further comprising:

a vent channel in fluid communication between a cavity in the ferrule boot and the ambient atmosphere to vent gas trapped in the cavity.

15. A ferrule boot for protecting an optical fiber ribbon connected to a terminal connector comprising:

a body member defining a channel extending therethrough;

a first tapered lead-in located at a distal end of the channel, the first tapered lead-in is sized and dimensioned such that the optical fiber ribbon a plurality of stripped and exposed optical fibers is insertable through the ferrule boot from a distal end of the channel to a proximal end of the channel and is affixed to a ferrule by adhesive; and a vent channel in fluid communication between a cavity in the ferrule and the ambient atmosphere to vent gas trapped in the cavity.

16. A ferrule boot for protecting an optical fiber ribbon connected to a terminal connector comprising:

a body member defining a channel extending lengthwise therethrough;

a first tapered lead-in located at a distal end of the channel, the first tapered lead-in is connected to a second tapered lead-in, wherein the first tapered lead-in is sized and dimensioned such that the optical fiber ribbon with a plurality of stripped and exposed optical fibers is insertable through the ferrule boot from the distal end of the channel to a proximal end of the channel and is affixed to a ferrule by an adhesive;

the second tapered lead-in located at the proximal end of the channel, wherein the second tapered lead-in prevents the adhesive from wicking to an exterior surface of the ferrule boot;

a lip positioned proximate to the proximal end of the channel and oriented at an angle with the channel such that the lip seals the adhesive in the ferrule boot and provides a lower resistance to movement of the optical fiber ribbon from the distal end of the channel to the proximal end of the channel and such that the lip presents a higher resistance to movement the optical fiber ribbon in the opposite direction; and a vent channel in fluid communication between a cavity in the ferrule boot and the ambient atmosphere to vent gas trapped in the cavity.

17. The ferrule boot of claim 16, wherein the channel further comprises a substantially straight section sized and dimensioned to fit intimately over the outside of the optical fiber ribbon, such that the substantially straight section centers and guides the stripped and exposed optical fibers to the center of the proximal end of the channel.

\* \* \* \* \*